United States Patent
Zhao et al.

(10) Patent No.: US 11,960,160 B2
(45) Date of Patent: Apr. 16, 2024

(54) SPLICED SCREEN AND DISPLAY TERMINAL

(71) Applicant: TCL CHINA STAR OPTOELECTRONICS TECHNOLOGY CO., LTD., Guangdong (CN)

(72) Inventors: Jun Zhao, Guangdong (CN); Bin Zhao, Guangdong (CN); Juncheng Xiao, Guangdong (CN); Hongyuan Xu, Guangdong (CN); Huajun Lu, Guangdong (CN)

(73) Assignee: TCL China Star Optoelectronics Technology Co., ltd., Guangdong (CN)

( * ) Notice: Subject to any disclaimer, the term of this patent is extended or adjusted under 35 U.S.C. 154(b) by 0 days.

(21) Appl. No.: 17/622,817

(22) PCT Filed: Dec. 21, 2021

(86) PCT No.: PCT/CN2021/140205
§ 371 (c)(1),
(2) Date: Dec. 25, 2021

(87) PCT Pub. No.: WO2023/108733
PCT Pub. Date: Jun. 22, 2023

(65) Prior Publication Data
US 2024/0027814 A1 Jan. 25, 2024

(30) Foreign Application Priority Data
Dec. 13, 2021 (CN) .......................... 202111520466.0

(51) Int. Cl.
*G02F 1/1333* (2006.01)
*G02F 1/13357* (2006.01)
*G09F 9/302* (2006.01)

(52) U.S. Cl.
CPC .... *G02F 1/13336* (2013.01); *G02F 1/133317* (2021.01); *G02F 1/133328* (2021.01); *G02F 1/133603* (2013.01); *G09F 9/3026* (2013.01)

(58) Field of Classification Search
CPC .......... G02F 1/13336; G02F 1/133317; G02F 1/133328; G02F 1/133603; G09F 9/3026
See application file for complete search history.

(56) References Cited

U.S. PATENT DOCUMENTS

| 2013/0176352 A1 | 7/2013 | Watanabe et al. |
| 2015/0362657 A1 | 12/2015 | Wang et al. |
| 2022/0404659 A1* | 12/2022 | Qi .......................... G02F 1/1336 |

FOREIGN PATENT DOCUMENTS

| CN | 202615763 U | 12/2012 |
| CN | 104035233 A | 9/2014 |

(Continued)

OTHER PUBLICATIONS

International Search Report in International application No. PCT/CN2021/140205, dated Sep. 15, 2022.
(Continued)

*Primary Examiner* — Anne M Hines
*Assistant Examiner* — Jose M Diaz
(74) *Attorney, Agent, or Firm* — PV IP PC; Wei Te Chung; Zhigang Ma

(57) ABSTRACT

A spliced screen and a display terminal are disclosed. In the spliced screen, a structural component is disposed on two adjacent display panels and covers a splicing gap between the two adjacent display panels. A lamp plate is disposed on a surface of the structural component. When the spliced screen displays an image, a plurality of luminescent bodies disposed on the lamp plate close to the display panels also emit light, thereby preventing black strips from appearing on the image. In the spliced screen, a viewing angle of the display panels and a viewing angle of the lamp plate are (Continued)

same, so that a brightness of the display panels and a brightness of the lamp plates are same when the spliced screen is viewed from a lateral side. As such, display quality is improved.

20 Claims, 4 Drawing Sheets

(56) References Cited

FOREIGN PATENT DOCUMENTS

| | | | |
|---|---|---|---|
| CN | 105845036 | A | 8/2016 |
| CN | 111145653 | A | 5/2020 |
| CN | 111290154 | A | 6/2020 |
| CN | 111312087 | A | 6/2020 |
| CN | 111369900 | A | 7/2020 |
| CN | 111653207 | A | 9/2020 |
| JP | 2000056713 | A | 2/2000 |
| JP | 2002108227 | A | 4/2002 |
| JP | 2012108271 | A | 6/2012 |
| TW | 201539405 | A | 10/2015 |
| WO | 2021190163 | A1 | 9/2021 |

OTHER PUBLICATIONS

Written Opinion of the International Search Authority in International application No. PCT/CN2021/140205, dated Sep. 15, 2022.
Chinese Office Action issued in corresponding Chinese Patent Application No. 202111520466.0 dated Jul. 4, 2022, pp. 1-9.

* cited by examiner

SPLICED SCREEN AND DISPLAY TERMINAL

FIELD

The present disclosure relates to a field of display technologies, and more particularly, to a spliced screen and a display terminal.

BACKGROUND

Spliced screens having display panels and a light-emitting diode (LED) lamp plate can realize a large-scale screen with low cost. In conventional spliced screens having panels and an LED lamp plate, the LED lamp plate covers a splicing gap between two adjacent display panels. Due to technical constraints, a protrusion is formed on a surface of the display panels where the LED lamp plate is disposed when the LED lamp plate covers the splicing gap between the display panels. In addition, the LED lamp plate has a certain height, and lamp strips display an amber color due to material thereof. When a dynamic image is displayed, a lateral edge of the LED lamp plate or the lamp strips is easy to be viewed when the spliced screens are viewed from a lateral side by users. The amber color displayed from an edge of the lamp strips will affect a display effect, resulting in an obvious height difference when the spliced screens are viewed from the lateral side. As such, an image displayed by the spliced screens corresponding to the LED lamp plate may have a black periphery.

SUMMARY

Embodiments of the present disclosure provide a spliced screen and a display terminal to solve an issue of a black periphery of an image displayed by conventional spliced screens due to an amber color displayed from an edge of lamp strips.

An embodiment of the present disclosure provides a spliced screen,
comprising at least two display panels, wherein a splicing gap is defined between the at least two display panels; at least one lamp plate, wherein the at least one lamp plate comprises a wiring plate and a plurality of luminescent bodies disposed on the wiring plate, and the at least one lamp plate is disposed on the at least two display panels and covers the splicing gap; and at least one reflective layer, wherein the at least one reflective layer is at least disposed on a lateral wall of a side of the wiring plate close to the at least two display panels, and the at least one reflective layer faces a light-emitting side of the at least two display panels adjacent to each other.

An embodiment of the present disclosure further provides a display terminal, comprising the above spliced screen.

Regarding the Beneficial Effects:

In a spliced screen, a reflective layer is disposed on a lateral wall of a wiring plate, thereby reflecting light emitted from a light-emitting side of a display panel. When a color image is displayed, the reflective layer reflects a color of the color image. Therefore, a height difference between the display panel and a lamp plate is compensated by the color image reflected from the reflective layer. As such, a black periphery can be eliminated, and display quality of the spliced screen can be improved.

DESCRIPTION OF DRAWINGS

Technical solutions and beneficial effects of the present disclosure are illustrated below in detail in conjunction with drawings and specific embodiments.

Figure 1:
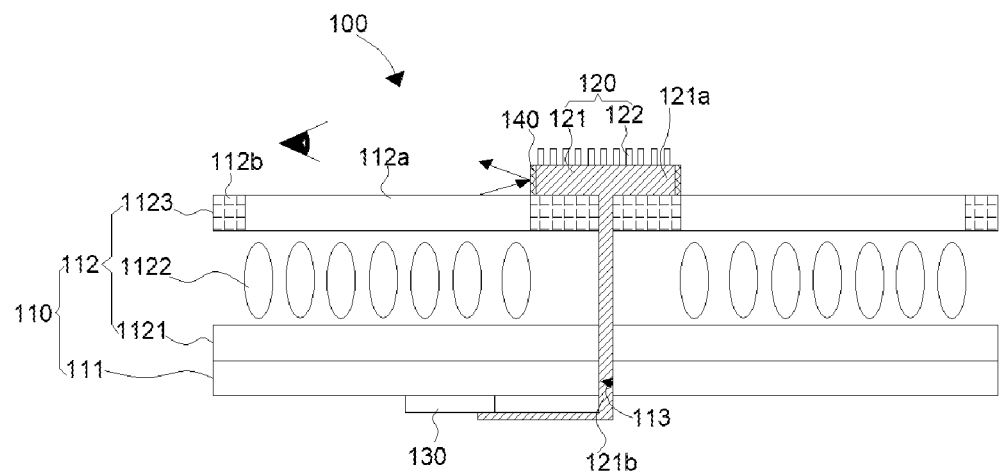
FIG. 1 is a structural schematic view showing a spliced screen according to an exemplary embodiment of the present disclosure.

Reference numbers in the drawings are as follows:
spliced screen 100, 100', 100", and 100''', display panel 110, backlight plate 111, liquid crystal display panel 112, display area 112a, non-display area 112b, array substrate 1121, liquid crystal layer 1122, color filter substrate 1123, lamp plate 120, wiring plate 121, first part 121a, second part 121b, third part 121c, luminescent body 122, control plate 130, reflective layer 140, reflective component 150, recess 151, light guide component 160.

DETAILED DESCRIPTION

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

In a spliced screen provided by the present disclosure, a reflective layer is disposed on a lateral wall of a wiring plate, thereby reflecting light emitted from a light-emitting side of a display panel. When a color image is displayed, the reflective layer reflects a color of the color image. Therefore, a height difference between the display panel and a lamp plate is compensated by the color image reflected from the reflective layer. As such, a black periphery can be eliminated, and display quality of the spliced screen can be improved. Typically, the spliced screen can be used in display terminals such as broadcasting media or big data centers.

Figure 2:
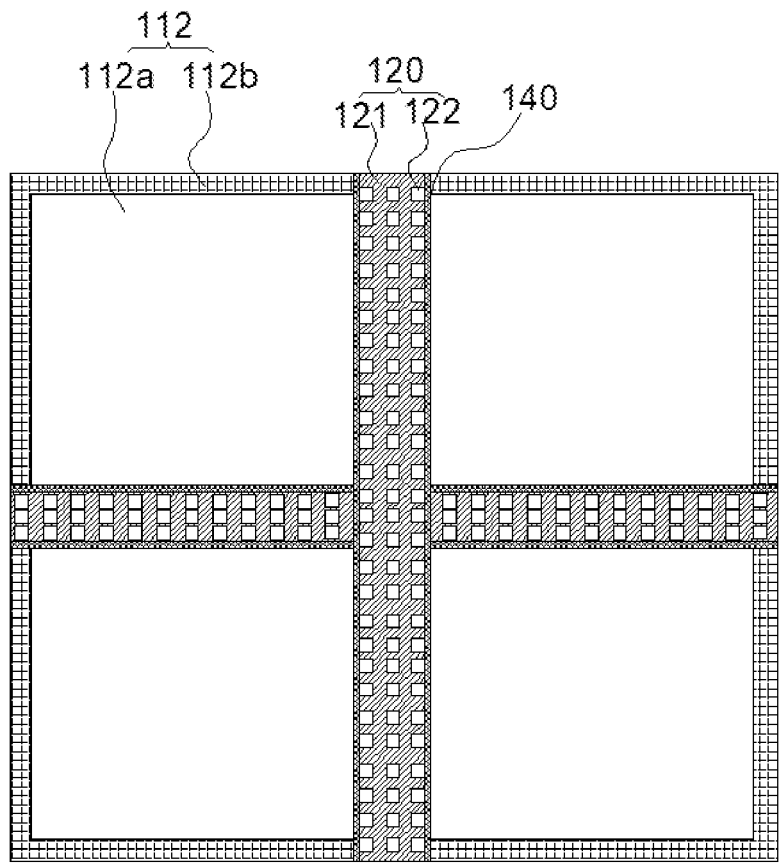
FIG. 2 is a structural schematic top view showing the spliced screen according to the exemplary embodiment of the present disclosure.

In one embodiment of the present disclosure, please refer to FIG. 1 to FIG. 2, a spliced screen 100 includes at least two display panels 110, at least one lamp plate 120, and at least one control plate 130. In the present embodiment, the display panels 110 are liquid crystal display (LCD) panels. In other embodiments, the display panels 110 may also be organic light-emitting diode (OLED) panels. In the present embodiment, each of the display panels 110 includes a backlight plate 111 and a liquid crystal panel 112 disposed on the backlight plate 111. The backlight plate 111 is electrically connected to the control plate 130. The control plate 130 controls the backlight plate 111 to emit backlight. The liquid crystal panel 112 includes an array substrate 1121 and a color filter substrate 1123, which are disposed opposite to each other, and a liquid crystal layer 1122 disposed between the array substrate 1121 and the color filter substrate 1123. Each of the display panels 110 includes a display area 112a and a non-display area 112b disposed on a periphery of the display area 112a. Two display panels 110 are sapcedly arranged, and a splicing gap 113 is defined between the two display panels 110. Specifically, the splicing gap 113 is defined between adjacent non-display areas 112b of the two display panels 110. The lamp plate 120 includes a wiring plate 121 and a plurality of luminescent bodies 122 disposed on the wiring plate 121. The luminescent bodies 122 are arraigned on the wiring plate 121 in an array manner. The lamp plate 120 is disposed on the two display panels 110, and the wiring plate 121 of the lamp plate 120 covers the splicing gap 113.

A control plate 130 is disposed on a surface of the backlight plate 111 away from the liquid crystal panel 112. The lamp plate 120 is electrically connected to the control plate 130 by the wiring plate 121. The control plate 130 controls the luminescent bodies 122 to emit light by the wiring plate 121.

In the present embodiment, a reflective layer 140 is disposed on a lateral wall of the wiring plate 121. The reflective layer 140 faces the non-display area 112a of adjacent display panels 110. Please refer to FIG. 3, the reflective layer 140 can reflect light emitted from a light-emitting side of the display area 112a of the display panels 110. That is, the reflective layer 140 can reflect a color image displayed by the display area 112a. A height difference between the display panels 110 and the lamp plate 120 can be compensated by the reflected color image, thereby eliminating a black periphery. Therefore, when users view the spliced screen 100 from a lateral side (especially a junction between the lamp plate 120 and the display panels 110), the color image reflected by the reflective layer 140 can be viewed. The black periphery will not be viewed. Thus, a visual experience is improved.

The reflective layer 40 may be a silver tape attached to the lateral wall of the wiring plate 121. Alternatively, the reflective layer 140 is a silver line evaporated on the lateral wall of the wiring plate 121.

The wiring plate 121 includes a first part 121a and a second part 121b which are sequentially connected. The first part 121a is disposed on the display panels 110 and covers the splicing gap 113. The luminescent bodies 112 are disposed on the first part 12a. The second part 121b is disposed in the splicing gap 113. An end of the second part 121b is electrically connected to the first part 121a, and another end of the second part 12b is electrically connected to the control plate 130 after being bent. The first part 121a and the second part 121b are integrated. The second part 121b is connected to the first part 121a and the control plate 130 by the splicing gap 113, thereby fully utilizing space in the splicing gap 113.

The wiring plate 121 is a flexible wiring plate. The wiring plate 121 includes the first part 121a and the second part 121b which are horizontally disposed. The second part 121b includes a straight section and a bending section. In another embodiment, the wiring plate is a printed circuit plate and includes a first plate body horizontally disposed, a second plate body vertically disposed in the splicing gap 113, and a third plate body horizontally disposed. The first plate body is disposed on the two display panels 110 and covers the splicing gap 113. An upper end of the second plate body is connected to the first plate body. An end of the third plate body is connected to a bottom end of the second plate body. Another end of the third plate body is connected to the control plate 130.

In the present embodiment, two lateral walls of the wiring plate 121 respectively extends to a junction between the display area 112a and the non-display area 112b of adjacent display panels 110. Therefore, the non-display area 112b defined on two sides of the splicing gap 113 is completely covered, thereby preventing display quality of the spliced screen 100 from being affected due to exposure of the non-display area 112b.

In the present embodiment, the display panels 10 (LCD panels) have advantages such as large display area, high stability, and low cost. However, the display panels 10 cannot realize a full-screen display because the display panels 10 have a frame (non-display area 112b). Although multiple display panels 110 can be spliced to each other to form a large spliced screen, the splicing gap 113 having a relatively large area is defined between the display panels 110 and cannot be eliminated. By covering the non-display area 112b with wiring plate 121, the spliced screen 100 can display an image without the splicing gap. The display panels 110 are arranged in an array manner and are spliced to each other. The wiring plate 121 covers the splicing gap 113 between any two adjacent display panels 110.

Figure 3:
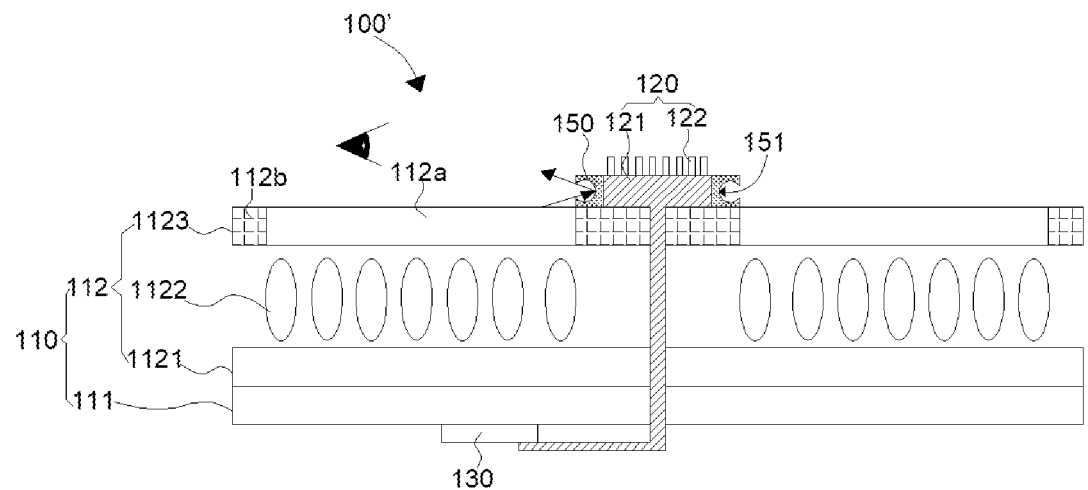
FIG. 3 is a structural schematic view showing a spliced screen according to another exemplary embodiment of the present disclosure.
Figure 4:
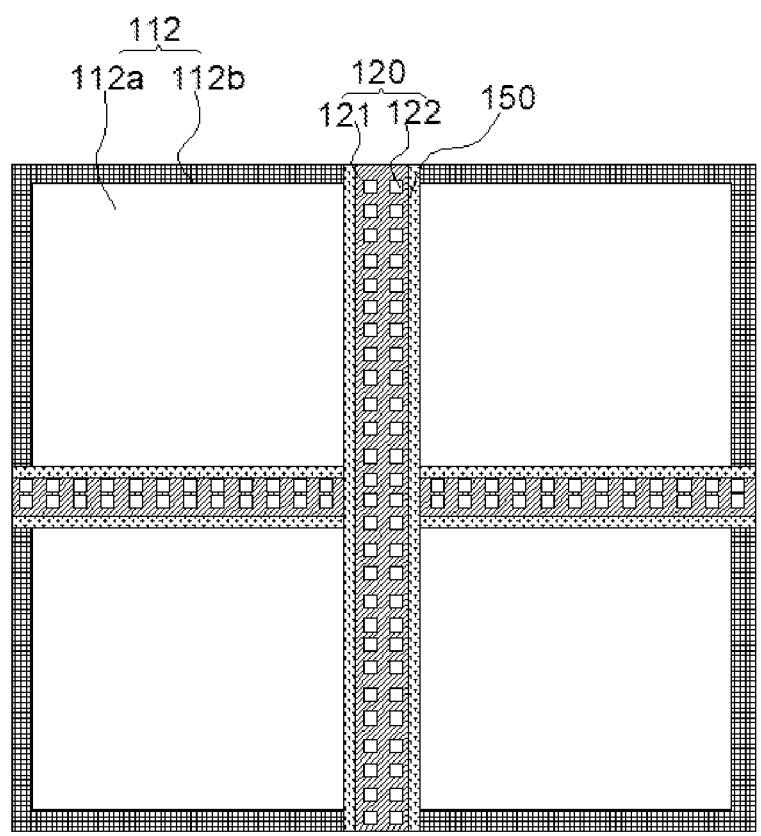
FIG. 4 is a structural schematic top view showing the spliced screen according to another exemplary embodiment of the present disclosure.

In another embodiment of the present disclosure, as shown in FIG. 3 to FIG. 4, a spliced screen 100' includes a light-reflective component 150. The light-reflective component 150 protrudes from a lateral wall of a wiring plate 121 and is disposed on the wiring plate 121. The light-reflective component 150 covers the lateral wall of the wiring plate 121. Specifically, the light-reflective component 150 covers a lateral wall of the first part 121a or a lateral wall of the first plate body. A surface of the light-reflective component 150 facing the display area 112a is a reflective surface which can reflect light emitted from the display area 112a of display panels 110. Therefore, a color image is reemitted, and a height difference between the display panels 110 and a lamp plate 120 is compensated by the reflected color image, thereby eliminating a black periphery corresponding to a lateral wall of the lamp plate 120.

In the present embodiment, the light-reflective component 150 is black. A material of the light-reflective component 150 is a light-reflective adhesive, thereby encapsulating the lateral wall of the wiring plate 121. Since the light-reflective component 150 is black, the reflective component and an area surrounding thereof are not so different when they are viewed. Therefore, the light-reflective component 150 can be reflected by a reflective surface. Preferably, a recess 151 is defined on a surface of the light-reflective component 150 facing the display area 112a. An inner surface of the recess 151 is the reflective surface. When light emitted from the display area 112a enters the recess 151, it can be reemitted outside after being reflected by the reflective surface of the recess 151. Therefore, a height difference between the display panels 110 and the lamp plate 120 can be compensated by the reflected color image, and a black periphery corresponding to the lateral wall of the lamp plate 120 can be eliminated. An opening degree of the recess 151 can be adjusted according to display requirements. The recess 151 can be compressedly molded in the light-reflective adhesive of the light-reflective component 150 by a compression molding.

In the present embodiment, the lateral wall of the wiring plate 121 extends to a surface of the non-display area 112*b* close to the splicing gap 113. That is, the wiring plate 121 covers part of the non-display area 112*b* of adjacent display panels 110. The light-reflective component 150 covers a surface of the non-display area 112*b* away from the splicing gap 113. That is, the light-reflective component 150 covers the rest of the non-display area 112*b*. The light-reflective component 150 and the wiring plate 121 fully cover the non-display area 112*b* defined on two sides of the splicing gap 113.

Figure 5:
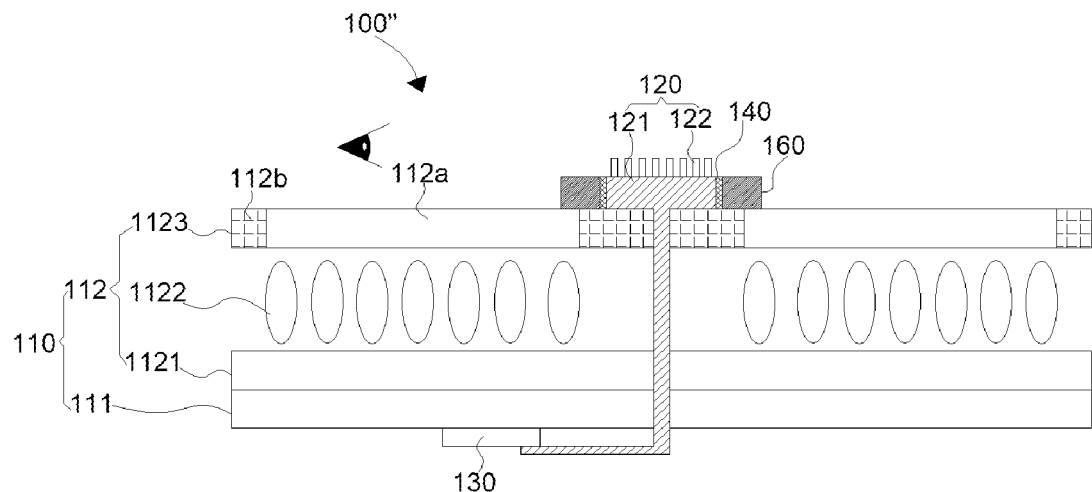
FIG. 5 is a structural schematic view showing a spliced screen according to yet another exemplary embodiment of the present disclosure.
Figure 6:
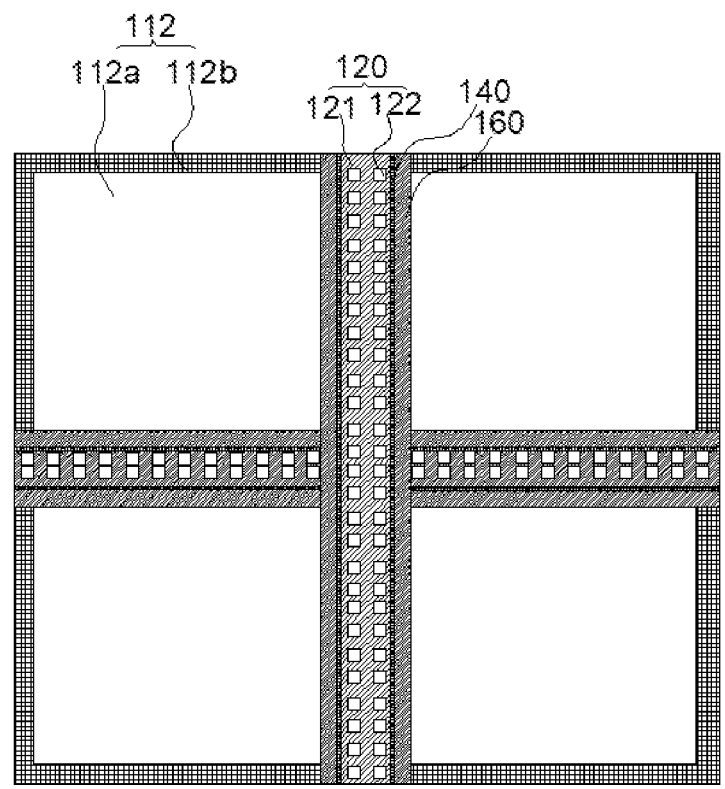
FIG. 6 is a structural schematic top view showing the spliced screen according to yet another exemplary embodiment of the present disclosure.

In another embodiment of the present disclosure, as shown in FIG. 5 to FIG. 6, a spliced screen 100" includes a reflective layer 140 and a light guide component 160. The light guide component 160 is disposed on a surface of the reflective layer 140 away from a lamp plate 120. The light guide component 160 at least covers part of a non-display area 112*a* close to a splicing gap 113. That is, light emitted from the display area 112*a* covered by the light guide component 160 is diffusely reflected after entering the light guide component 160, thereby eliminating a black periphery due to a height difference between the lamp plate 120 and display panels 110. Light emitted from the display area 112*a* covered by the light guide component 160 is diffusely reflected after entering the light guide component 160, thereby guiding light emitted from the display area 112*a*. This cooperated with reflection of the reflective layer 140 can eliminate the black periphery due to a height difference between the lamp plate 120 and the display panels 110. In another embodiment of the present disclosure, the light guide component 160 is directly disposed on a lateral wall of the lamp plate 120. The light guide component 160 covers part of the display area 112*a* close to the splicing gap 113.

Figure 7:
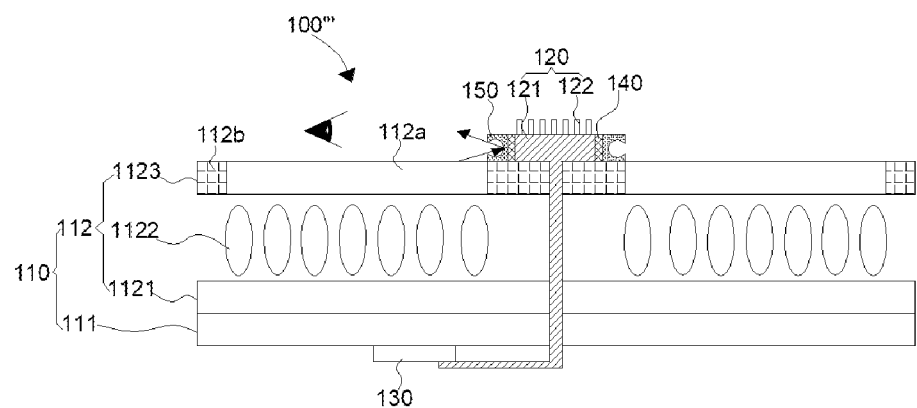
FIG. 7 is a structural schematic view showing a spliced screen according to still another exemplary embodiment of the present disclosure.
Figure 8:
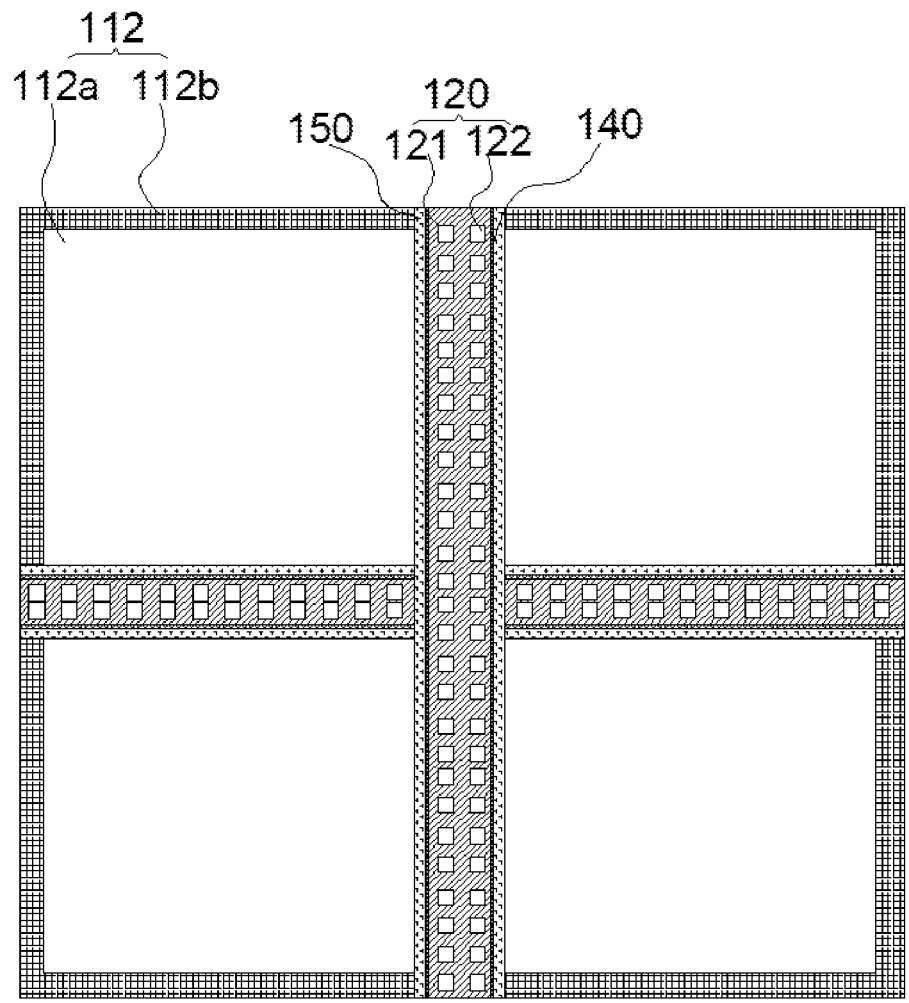
FIG. 8 is a structural schematic top view showing the spliced screen according to still another exemplary embodiment of the present disclosure.

In another embodiment of the present disclosure, as shown in FIG. 7 to FIG. 8, a splicing screen 100''' includes a reflective layer 140 and a light-reflective component 150. The reflective layer 140 is disposed a lateral wall of a wiring plate 121. The light-reflective component 150 protrudes from a surface of the reflective layer 140 away from the wiring plate 121 and is disposed on the surface of the reflective layer 140 away from the wiring plate 121. A reflective surface of the light-reflective component 150 can diffusedly reflect light emitted from a display area 112*a* of display panels 110, thereby reemitting a color image. A height difference between the display panels 100 and the lamp plate 120 can be compensated by the reflected color image, thereby eliminating a black periphery at a lateral wall of the lamp plate 120.

In summary, the present disclosure has been described with preferred embodiments thereof. The preferred embodiments are not intended to limit the present disclosure, and it is understood that many changes and modifications to the described embodiments can be carried out without departing from the scope and the spirit of the disclosure that is intended to be limited only by the appended claims.

What is claimed is:

1. A spliced screen, comprising
    at least two display panels, wherein a splicing gap is defined between the at least two display panels;
    at least one lamp plate, wherein the at least one lamp plate comprises a wiring plate and a plurality of luminescent bodies disposed on the wiring plate, and the at least one lamp plate is disposed on the at least two display panels and covers the splicing gap; and
    at least one reflective layer, wherein the at least one reflective layer is at least disposed on a lateral wall of a side of the wiring plate close to the at least two display panels, and the at least one reflective layer faces a light-emitting side of the at least two display panels adjacent to each other.

2. The spliced screen of claim 1, wherein each of the at least two display panels comprises a display area and a non-display area defined on a periphery of the display area, the splicing gap is defined between two adjacent non-display areas of the at least two display panels, and the wiring plate covers at least part the non-display area of the at least two display panels.

3. The spliced screen of claim 2, wherein a light-reflective component is disposed on a surface of the reflective layer away from the wiring plate, and a surface of the light-reflective component facing the at least two display panels is a reflective surface.

4. The spliced screen of claim 3, wherein a recess is defined on the surface of the light-reflective component facing the at least two display panels, and the surface where the recess is defined is the reflective surface.

5. The spliced screen of claim 3, wherein the light-reflective component is black.

6. The spliced screen of claim 2, wherein a light guide component is disposed a surface of the reflective layer away from the wiring plate, and the light guide component at least covers the display area close to the splicing gap.

7. The spliced screen of claim 6, wherein the reflective layer is a silver reflective layer.

8. The spliced screen of claim 1, wherein the at least two display panels are a plurality of liquid crystal display (LCD) panels, each of the LCD panels comprises a backlight plate and a liquid crystal panel disposed on the backlight plate, a control plate is disposed on a surface of the backlight plate away from the liquid crystal panel, and the lamp plate is electrically connected to the control plate by the wiring plate.

9. The spliced screen of claim 8, wherein the wiring plate comprises a first part and a second part, which are sequentially connected, the first part is disposed on the liquid crystal panel and covers the splicing gap, the luminescent bodies are disposed on the first part, and an end of the second part away from the first part is electrically connected to the control plate.

10. The spliced screen of claim 9, wherein the wiring plate is a flexible wiring plate or a printed circuit board.

11. A display terminal, comprising a spliced screen, wherein the spliced screen comprises:
    at least two display panels, wherein a splicing gap is defined between the at least two display panels;
    at least one lamp plate, wherein the at least one lamp plate comprises a wiring plate and a plurality of luminescent bodies disposed on the wiring plate, and the at least one lamp plate is disposed on the at least two display panels and covers the splicing gap; and
    at least one reflective layer, wherein the at least one reflective layer is at least disposed on a lateral wall of a side of the wiring plate close to the at least two display panels, and the at least one reflective layer faces a light-emitting side of the at least two display panels adjacent to each other.

12. The display terminal of claim 11, wherein each of the at least two display panels comprises a display area and a non-display area defined on a periphery of the display area, the splicing gap is defined between two adjacent non-display areas of the at least two display panels, and the wiring plate covers at least part the non-display area of the at least two display panels.

13. The display terminal of claim 12, wherein a light-reflective component is disposed on a surface of the reflective layer away from the wiring plate, and a surface of the light-reflective component facing the at least two display panels is a reflective surface.

14. The display terminal of claim 13, wherein a recess is defined on the surface of the light-reflective component facing the at least two display panels, and the surface where the recess is defined is the reflective surface.

15. The display terminal of claim 13, wherein the light-reflective component is black.

16. The display terminal of claim 12, wherein a light guide component is disposed a surface of the reflective layer away from the wiring plate, and the light guide component at least covers the display area close to the splicing gap.

17. The display terminal of claim 16, wherein the reflective layer is a silver reflective layer.

18. The display terminal of claim 11, wherein the at least two display panels are a plurality of liquid crystal display (LCD) panels, each of the LCD panels comprises a backlight plate and a liquid crystal panel disposed on the backlight plate, a control plate is disposed on a surface of the backlight plate away from the liquid crystal panel, and the lamp plate is electrically connected to the control plate by the wiring plate.

19. The display terminal of claim 18, wherein the wiring plate comprises a first part and a second part, which are sequentially connected, the first part is disposed on the liquid crystal panel and covers the splicing gap, the luminescent bodies are disposed on the first part, and an end of the second part away from the first part is electrically connected to the control plate.

20. The display terminal of claim 19, wherein the wiring plate is a flexible wiring plate or a printed circuit board.

* * * * *